United States Patent

[11] 3,596,450

| [72] | Inventor | Richard A. Bowers<br>1029 E. 3rd St., Florence, Colo. 81226 |
|---|---|---|
| [21] | Appl. No. | 835,911 |
| [22] | Filed | June 19, 1969 |
| [45] | Patented | Aug. 3, 1971<br>Continuation-in-part of application Ser. No. 522,608, Jan. 24, 1966, now Patent No. 3,455,398. |

[54] LAWN MOWER ATTACHMENTS
12 Claims, 7 Drawing Figs.

[52] U.S. Cl. .................................................... 56/193,
56/27, 56/256, 172/21
[51] Int. Cl. .................................................... A01d 43/02
[50] Field of Search ...................................... 56/25.4, 27,
256, 193; 172/21

[56] References Cited
UNITED STATES PATENTS

| 2,595,976 | 5/1952 | Patterson | 56/25.4 |
|---|---|---|---|
| 2,707,858 | 5/1955 | Norton et al. | 56/25.4 |
| 2,760,327 | 8/1956 | Bovee | 56/25.4 |
| 2,857,728 | 10/1958 | Smith et al. | 56/25.4 |
| 2,896,603 | 7/1959 | Buske et al. | 56/25.4 X |
| 3,053,035 | 9/1962 | Early | 56/256 |
| 3,125,165 | 3/1964 | Boudreaux et al. | 56/25.4 X |
| 3,183,652 | 5/1965 | Pratt | 56/25.4 |
| 3,308,612 | 3/1967 | Oblinger | 56/27 |
| 3,478,500 | 11/1969 | Rhoads | 56/27 |

*Primary Examiner*—Russell R. Kinsey
*Attorney*—C. B. Messenger

ABSTRACT: An adapter system and attachments therefor which utilizes the structural and drive features of powered lawn mowers inclusive of the cutter blade-fan to provide additional power rake, brush, edger and nonscalping features. A drive connection is provided to power a horizontally disposed shaft upon which flails and similar edger or lawn dressing tools may be positioned for contact with a lawn or turf surface. Flexible tines or flails of a power-rake attachment are held in operative position by a plurality of intermeshing disc supports. A combination cutter blade-fan is used in alternate positions, and a mounting component therefor provides a nonscalping feature.

PATENTED AUG 3 1971
3,596,450
SHEET 1 OF 3
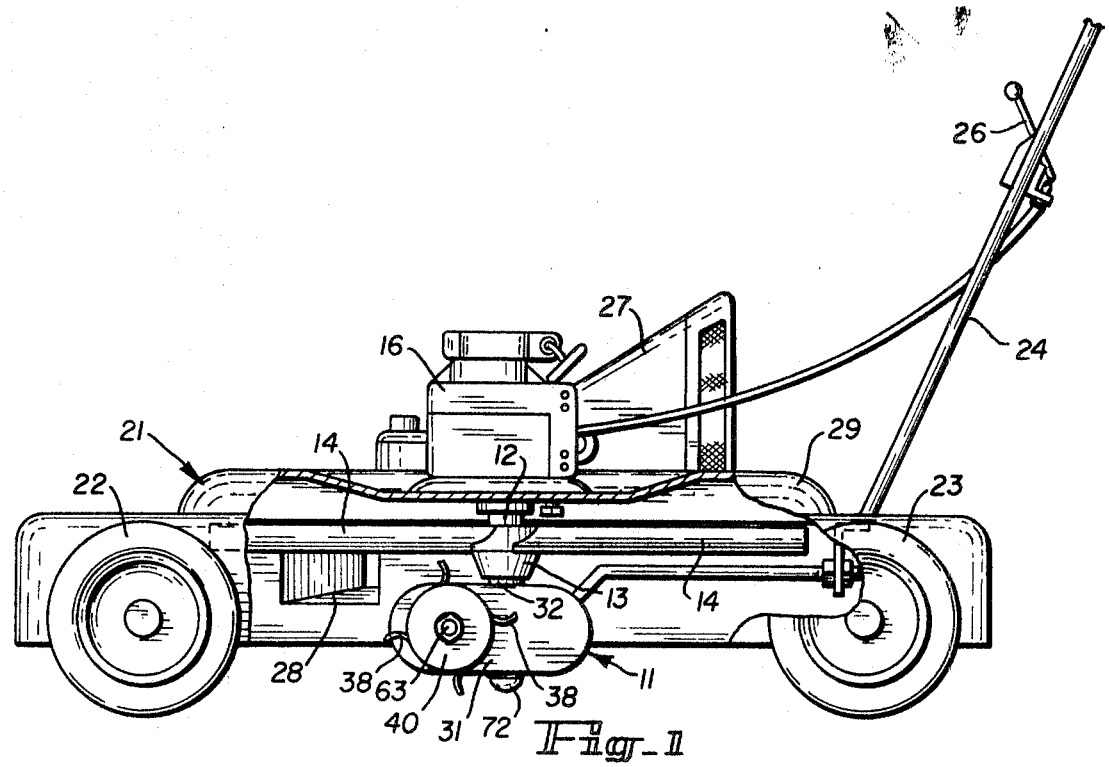
Fig_1
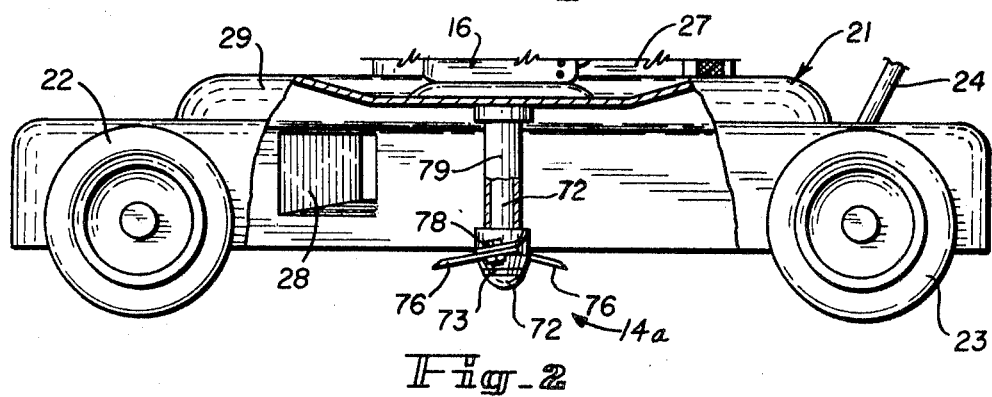
Fig_2
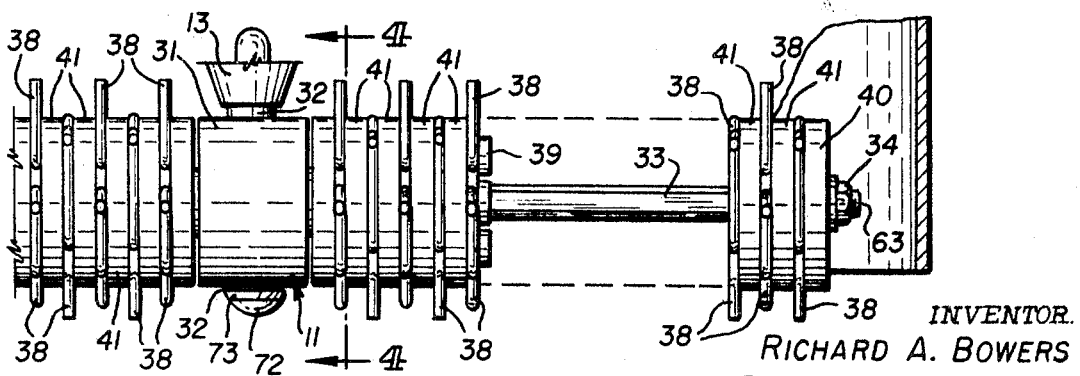
Fig_3
INVENTOR.
RICHARD A. BOWERS
BY
*Messenger*
ATTORNEY

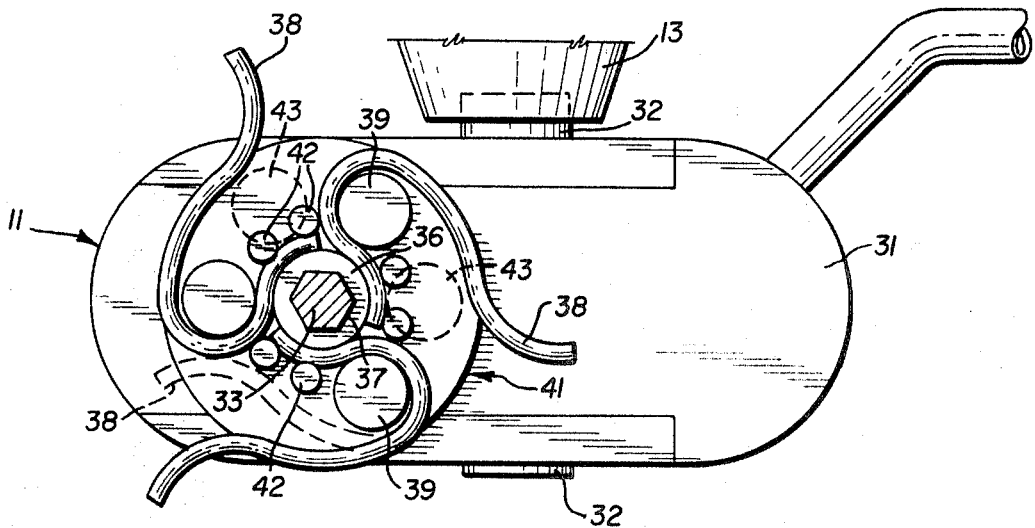
Fig_4
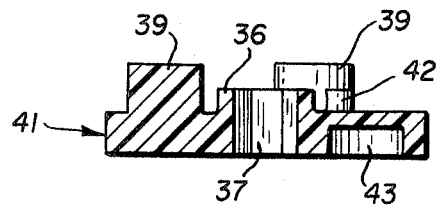
Fig_5
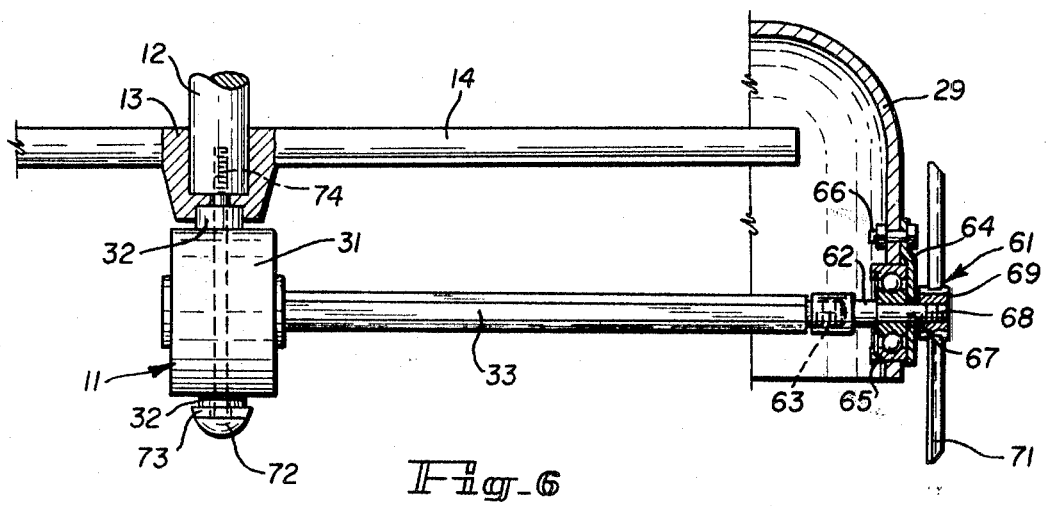
Fig_6
INVENTOR.
RICHARD A. BOWERS
BY
ATTORNEY

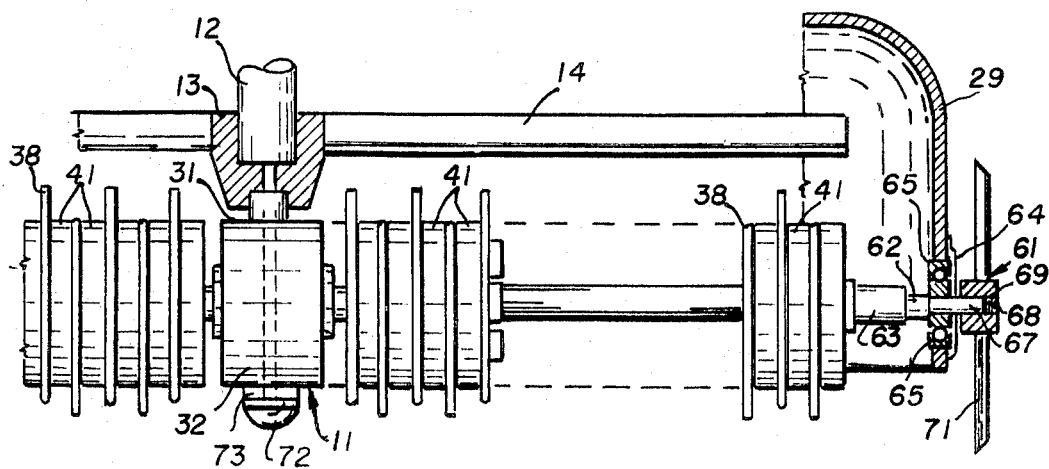

LAWN MOWER ATTACHMENTS

CROSS-REFERENCE TO RELATED APPLICATION

The present application is a continuation-in-part of application Ser. No. 522,608 now U.S. Pat. No. 3,455,398, filed Jan. 24, 1966, by the present inventor and entitled "Power-Rake and Aerator Attachment."

BACKGROUND OF THE INVENTION

The present invention is in general related to the same field of development as that recognized in the mentioned previous application. Accordingly, a major objective is to provide economically produced attachments for lawn mowers that can be used beneficially by home owners to facilitate lawn care operations in addition to simple lawn mowing procedures.

Primarily, the present invention provides a power-rake that may be used to remove accumulated debris from a lawn as necessary to improve the health and growth characteristics thereof. A further attachment provides an edger that may be installed on and driven by the lawn mower when edge trimming operations are to be accomplished. All the attachments are powered by a gear drive that is attachable to the cutting blade drive for a lawn mower. A combination cutting blade-fan is used together with the gear drive to facilitate extraction and removal of loosened clippings and debris when the unit is operated.

As in the previous application, the present device is directed to a unit which utilizes not only the drive motor and some drive components of a regular lawn mower but which further uses the wheel support frame and housing components of a conventional lawn mower system. By reason of such characteristic the present invention is distinguished from the "power handle" type developments in the prior art characterized by Burrows U.S. Pat. No. 2,975,839. The present invention has further distinguishing features when considered in connection with the references cited in the mentioned prior application. Such references include U.S. Pat. Nos.:

2,823,597—Kelsey 2,860,475—Richard 3,123,149—White 3,190,064—Wenzel

SUMMARY OF THE INVENTION

Briefly stated, the present invention provides attachments for use with power lawn mowers of the rotary type. A cutter blade which provides an additional fan characteristic for elevating and propelling separated materials to a point of discharge is used together with a drive assembly that is attachable to the shaft for such blade-fan. The output from the drive assembly rotates an attachment drive shaft disposed horizontally in position spaced above a lawn or turf surface. Power-rake elements or power-brush or other rotary components, such as the aerator shown in the previous application, may be disposed on such horizontal shaft for the accomplishment of various lawn treatment operations. The horizontal shaft is also used to drive an edger attachment connected to the horizontal drive shaft and supported at an outboard position by bearings attached to the frame or housing for the lawn mower. When the drive assembly is removed, the attaching components that are normally used to hold the drive in place can be used alternately to hold a cutter blade or blade-fan in place for lawn cutting operations. These attachment components can then provide a further advantageous result, since they help to prevent scalping of the lawn surface due to irregularities of contour.

The power-rake attachment includes separate resilient tines disposed in patterned arrangement and supported by a plurality of cooperatively mating disk support elements. The tines and the disk supports provide for the rotational and reciprocal movement of the tines to prevent damage to the power-rake attachment and the drive systems therefor when obstacles are encountered.

BRIEF DESCRIPTION OF THE DRAWINGS

FIG. 1 is a side elevation in partial cross section showing features of the power-rake and drive components of this invention with a blade-fan disposed at a raised elevation, FIG. 2 is a partial cross-sectional elevation similar to that of FIG. 1 showing a modified blade-fan in its lowered lawn cutting position, FIG. 3 is a front elevation showing features of a power-rake attachment, FIG. 4 is a side elevation taken along the line 4—4 of FIG. 3 with parts omitted, FIG. 5 is a cross section taken through a single support disk, FIG. 6 is a front elevation similar to that of FIG. 3 showing the mounting and drive features of an edger attachment, and FIG. 7 is a front elevation similar to that of FIGS. 3 and 6 showing a power-rake and edger combination.

DESCRIPTION OF THE PREFERRED EMBODIMENTS

Primarily the present invention provides a drive system for various powered attachments to be used on a conventional lawn mower. The drive system is comparable to that shown and described in the mentioned previous application. Notable changes and improvements, however, are provided. Primarily the present system provides a powered drive for a single horizontal shaft. The auxiliary drive assembly is illustrated in FIGS. 1, 3 and 4. In FIG. 1 drive assembly 11 is applied to an engine output shaft 12 disposed within the hub 13 of a blade-fan 14. The output shaft 12 extends from an engine 16 which is normally used to rotate the blade-fan 14 to cut grass when it is in the same position as blade 14a in FIG. 2 as the lawn mower 21 is moved along a supporting turf surface contacted by the wheels 22 and 23. An operator handle 24 and engine controls 26 are provided. The structure of lawn mower 21 can further include an elevated discharge 27 so that severed materials may be deposited in a bag or catcher (not shown). A lower discharge 28 in frame housing 29 can be used alternately when separated materials are to be windrowed or blown loosely about the lawn.

The drive assembly 11 includes a case 31, held in position relative to the mower housing by the brace illustrated in FIG. 1, which preferably encloses a worm drive, the ends of which extend outwardly of the case 31 and are identified by the number 32. Worm 32 which has a vertically disposed axis drives a gear (not shown) having a horizontally disposed axis oriented transversely to the normal direction of movement for the lawn mower 21. A hex shaft 33 for the drive 11 extends laterally from the case 31 to provide a mounting and drive for various rotary attachments. Preferably the horizontal shaft 33 extends through the center of the drive gear disposed within the gear box 31, and it is held in near centered relationship with respect thereto by the rotary components that are applied to the oppositely extending ends of the shaft 33.

Where a power rake is to be used, as shown in FIGS. 1, 3 and 4, a plurality of flail or tine support disks 41 are used on shaft 33. They are installed one by one on the shaft and then held in desired position by nuts 34 applied to the opposite ends of the shaft 33. The hub 36 of each of the support disks 41 has a central opening 37 formed to closely engage the shaft 33. As shown in FIG. 4, both the shaft 33 and central opening 37 are preferably provided with a hexagonal drive shape. With this arrangement rotation of the horizontal drive shaft 33 will cause a corresponding rotation of each of the support disks 41. A plurality of flails or tines 38 are disposed on each of the disks 41 and are held in desired position by the cooperative placement of the stubs 39, posts 42 and the stub receptacles 43 of disks 41. When the unit is assembled, the raised stubs 39 of one disk are engaged into the receptacles 43 of the next adjacent disk 41. The tines are positioned as shown and are then held in place by the stubs 39 and posts 42.

With a plurality of disks in side by side relation as shown in FIG. 3, the tines 38 will be maintained in a staggered relationship due to the fact that the stubs 39 and the receptacles 43 of each disk 41 are out of phase. Actually the tines are disposed in row patterns separated 60° one row from the other. When the tines 38 are made of resilient material, such as abrasion resistant or spring steel, this regulated row pattern will be altered by the individual flexing and resilience characteristics of separate tines. The resilience of the tines is important for additional reasons, since the tines may often be brought into contact with rocks and other obstacles. In order to avoid damage to the machine and especially to the drive components thereof, the disks 41 provide a plurality of receptacles or spaces into which the tines 38 may be retracted, as shown in dotted outline on FIG. 4. Once a spring has been retracted by impingement against an object, it will return to its operative position once the obstruction is past. With this arrangement the tines have reciprocal and rotational freedom of movement to minimize damage and other problems resulting from haphazard contacts with nonyielding surfaces.

The resilience of the tines further tends to improve the debris freeing operations of the present power-rake attachment. As each tine comes into contact with the supporting ground or turf surface, it will be slightly deformed. This deformation maintains a contacting pressure against the surface that will assure an efficient raking or scratching of the surface. With continued rotation of the rake attachment the tine will eventually move out of contact with the treated surface. Upon termination of the contacting relationship the resilient tine will tend to throw released debris rearwardly as the spring stresses in the tine are relieved. This motion tends to initially elevate the separated debris and materials, and the materials are subsequently picked up by the forces exerted by the rotating blade-fan 14 for delivery out of the openings 28 or 27 or into the grass catcher or bag type attachment normally used with conventional lawn mowers.

The entire power-rake attachment can be economically built and assembled. This economy of construction in part results from the use of identical components. All of the tines 38 are of identical construction, and all of the disks 41 are identical except for end disks 40. Since the loadings on any individual disk are relatively low, a die cast metal or injection molded plastic may be used.

The same drive components that provide the power-rake attachment shown in FIGS. 1, 3 and 4 can be used as shown in FIG. 6 to provide driving power for an edger attachment. The edger attachment 61 of FIG. 6 includes a stub shaft 62 which has a counterbore in its inboard end that is threaded and adapted for engagement on the threaded end 63 of horizontal drive shaft 33. When the edger 61 is to be applied to the drive shaft, nut 34 is removed and stub shaft 62 is substituted therefor. An outboard bearing support 64 is attached to the lawn mower frame housing 29 by bolts 66. Bearing support 64 encloses a bearing 65 that is applied to an outboard end 67 of the stub 62. Outboard end 67 is itself provided with a thread 68 for mating engagement with the hub 69 of the edger cutter blade 71. Since all of the threads are designed to tighten with use, the entire edger attachment may be applied to the horizontal drive shaft by rotating the blades 71. When the edger is fully attached and the mounting bolts 66 are secured, the edger blade 71 will be rotated when the engine is running.

Since the edger is substantially aligned with the centerline of the engine and is, accordingly, disposed between the lawn mower support wheels 22 and 23, the edge trimming or cutting operations can at any time be interrupted by elevating the front wheels 22 of the lawn mower out of contact with the supporting ground. Downward pressure on the operator handle 24 is used to elevate the edger and front wheel supports. As the edger blades 71 are moved into contact with the lawn, the cutting operation will proceed.

In order to minimize indiscriminate movement of severed materials, the cutter blades 71 are bent as shown in FIG. 6. The bend is designed to deliver severed materials inwardly beneath the lawn mower housing 29 where the lighter materials can again be elevated and discharged by action of the blade-fan 14. While the edger alone may be mounted on the lawn mower at time of use, it is acknowledged that there would be occasions when it might be desirable to accomplish edging operations while the power-rake was in place. For this reason the cutting diameter of the edger blade 71 is preferably greater than the operative diameter defined by the swinging tines 38. With this arrangement and proper positioning of the height adjustments normally provided on lawn mowers, the edger attachment can be applied when the power-rake components are in place.

For power-rake and for edger operations the blade-fan 14 is disposed at an elevated position where it merely acts as a fan. This elevated position prevents interference between the blade-fan and the tines 38 of the power-rake. In such elevated position the hub 13 of the blade-fan 14 is applied directly to the output shaft 12 of the engine 16 (see FIG. 6). A mounting component or bolt 72 is then extended through a lower spacer 73 and through the worm 32 so that the threads 74 of the mounting bolt are engaged in the end of the engine output shaft 12. This holds the case 31 in engaged position so that the worm 32 will be rotated by the engine to drive the through horizontal shaft 33. This same mounting component or bolt 72 is used to hold the blade-fan 14 in the operative lawn-cutting position, as shown in FIG. 2. Here a modified type of cutter blade 14a is illustrated. The modification includes the provision of replaceable blades 76 that are bolted to the blade support 77 by use of the bolts 78. A spacer or collar 79 maintains the blade-fan 14a in operative position when the bolt 72, which passes through the collar 79, is engaged to the engine output shaft 12.

In this normal lawn cutting configuration the attachment components provided by elements 72 and 73 extend beneath the cutting blade, and the rounded head of the bolt 72 is then disposed for contact with raised bumps or obstructions in the turf surface. When a raised hump of turf or an obstruction is contacted by the attachment components 72—73, the cutter blade 14a and the entire lawn mower will be raised. This type of operation prevents scalping of the lawn surface by the cutter blade and can often prevent scraping of the blade-fan against hard obstructions.

I claim:

1. In a lawn mower normally having a housing constituting a frame structure providing a discharge opening for grass cuttings, support wheels on said frame for moving the unit along a turf surface, a drive motor and drive, a blade-fan operatively connected to said drive, an attachment for use with and disposed beneath said blade-fan comprising engaging means for attachment to the blade-fan drive of said lawn mower, reduction means connected to said engaging means and providing an output drive at reduced speed, a driven shaft engaged to said output drive for rotation about a horizontal axis in position closely adjacent to the turf to be conditioned, resilient impact rotating members for disposition in side by side relation, a plurality of separate drive connector components disposed cooperatively in interconnected side by side relation on said driven shaft and operative with said impact rotating members for supporting said impact rotating members and interconnecting said impact rotating members to the driven shaft whereby the members are rotated for repeated contact with the turf, and means provided by said drive connectors and cooperative with respect to the resilience of said impact rotating members for allowing relative freedom of movement between said impact rotating members and the driven shaft to prevent damage to said elements when obstructions on the turf surface are contacted by said rotating members, said blade-fan being operative to move and discharge materials loosened by the impact rotating members through the discharge opening of said housing-frame.

2. Structure as set forth in claim 1 wherein a plurality of adjacent separate parts are identical.

3. Structure as set forth in claim 1 wherein said separate parts each provide at least one protuberance and one receptacle with the protuberances and receptacles of separate parts being adapted for mating contact.

4. Structure as set forth in claim 3 wherein said mating protuberance and receptacle combination provides support for said impact rotating members.

5. Structure as set forth in claim 1 wherein said separate parts in their assembled relationship provide a recess facilitating the desired relative freedom of motion for said impact rotating members.

6. Structure as set forth in claim 1 wherein said engaging means rotates with said drive motor and is inclusive of a fastener extending downwardly beneath said attachment and in position for contact with the ground surface and/or obstructions thereon and further including a curved or rounded end whereby said attachment and the rake elements thereof will be raised to prevent damage thereto and to the turf when raised obstructions are encountered.

7. Structure as set forth in claim 2 wherein the adjacent separate parts are of substantially disk shape extending outwardly from a centrally disposed driven shaft.

8. Structure as set forth in claim 7 wherein a plurality of protuberances and receptacles are provided on said disk parts with the protuberances and receptacles of the separate disk parts being adapted for mating contact and with the impact rotating members being mounted on said mated protuberances.

9. Structure as set forth in claim 8 wherein the protuberances for said disk parts are disposed on one side thereof and the receptacles on an opposite side thereof.

10. Structure as set forth in claim 8 wherein said impact rotating members are of a reverse curve shape.

11. Structure as set forth in claim 10 wherein said separate disk parts in their assembled relationship provide a recess cooperative with respect to the resilience of said impact rotating members to provide the desired relative freedom of motion for said impact rotating members.

12. In a lawn mower normally having a housing constituting a frame structure providing a discharge opening for grass cuttings, support wheels on said frame for moving the unit along a turf surface, a drive motor, a vertically disposed drive connected to said drive motor, a blade-fan rotating in a horizontal plane and operatively connected to said drive for cutting grass and delivering the cut grass through said discharge opening, an attachment for use with said blade-fan comprising engaging means for interconnection to the blade-fan drive of said lawn mower, a driven shaft mounted on said housing-frame for rotation about a horizontal axis, power transmission means interconnecting said engaging means and said driven shaft for rotating said shaft, impact rotating members for disposition in side by side relation on said horizontally disposed driven shaft, drive connector components for interconnecting said impact rotating members to the driven shaft whereby the members are rotated for repeated contact with the turf for power-rake purposes, and an edger blade rotated by said horizontal driven shaft and disposed for contact with said turf surface for edge trimming operations.